United States Patent [19]

Hanson

[11] Patent Number: 5,335,401
[45] Date of Patent: Aug. 9, 1994

[54] SHOELACE TIGHTENING AND LOCKING DEVICE

[76] Inventor: Gary L. Hanson, W63 N14346 Washington Ave., No. 2, Cedarburg, Wis. 53012

[21] Appl. No.: 107,917

[22] Filed: Aug. 17, 1993

[51] Int. Cl.⁵ .............................................. F16G 11/00
[52] U.S. Cl. ................... 24/712.5; 24/712.9; 24/713.5
[58] Field of Search ............... 24/712.5, 712, 712.1, 24/712.2, 712.3, 712.6, 712.9, 713, 713.2, 713.5, 714.6; 36/50.1

[56] References Cited

U.S. PATENT DOCUMENTS

| | | | |
|---|---|---|---|
| 1,481,903 | 1/1924 | Hart | 24/712.6 |
| 2,200,895 | 5/1940 | Rio | 24/712.5 |
| 2,315,196 | 3/1943 | Gallione | 24/712.6 |
| 3,106,003 | 10/1963 | Herdman | 24/712.3 |
| 4,884,321 | 12/1989 | Holub | 24/712.6 |
| 4,967,454 | 11/1990 | Elieff | 24/712.1 |
| 4,999,889 | 3/1991 | LeCouturer | 24/713.2 |
| 5,029,371 | 7/1991 | Rosenblood et al. | 24/712.9 |
| 5,097,573 | 3/1992 | Gimeno | 24/712.6 |

Primary Examiner—Victor N. Sakran
Attorney, Agent, or Firm—Nilles & Nilles

[57] ABSTRACT

A device for quickly tightening shoelaces on a shoe and for locking the tightened laces without the need for tying a bow or other knot is disclosed. The device includes a body unit with a slotted opening formed with a chamfered edge along one side of the slot. A rotatable shaft which includes a set of chamfered ridges rolls laterally across the width of the slot. A shoelace introduced through the slot becomes pinched between the chamfered edge of the slotted opening and the chamfered ridges of the shaft. The shaft is spring biased to automatically lock the laces in place upon being tightened to the desired tension. A quick release lever retracts the shaft to unpinch the lace.

8 Claims, 2 Drawing Sheets 5,335,401

SHOELACE TIGHTENING AND LOCKING DEVICE

BACKGROUND OF THE INVENTION

1. Field of the Invention

This invention relates to a device for quickly tightening shoelaces on a shoe and for locking the tightened laces without the need for tying a bow or other knot.

2. Background of the Art

The long-standing method of fastening a laced shoe or boot to one's foot has been to pull on the ends of the shoelaces to adjust the tension to the desirable comfort level, and then tie the ends of the shoelace together in a bow or other kind of knot. The bow or knot is tied in a fashion that will securely hold the laces at the proper tension level yet allow the wearer to untie the knot relatively easily.

In some circumstances, however, it is desirable to have an easier and quicker method of tightening and locking the shoelaces. A triathlon, for example, involves the successive events of swimming, biking, and running long distances, and the participants usually change their attire including their shoes between each event. A method of quickly tightening and fastening one's shoes would save time in a sporting event where speed is crucial. Children would also benefit from being able to quickly and easily fasten their shoes without having to learn how to tie shoelaces into a bow. Other persons may simply desire an alternative method of fastening their shoes.

Hook and loop type fasteners (e.g., Velcro TM) have been used in recent years to fasten shoes. Other devices for tightening and fastening shoelaces are disclosed, for instance, in U.S. Pat. Nos. 4,884,321; 4,967,454; 4,999,889; 5,029,371; and 5,097,573.

SUMMARY OF THE INVENTION

A device for quickly tightening and locking shoelaces is disclosed. The device is designed so that the user merely needs to pull the laces to tighten them, and the laces automatically lock in place. To release the laces, the user activates a quick release mechanism. The device utilizes a grooved, spring-biased roller to pinch the laces between a set of chamfered edges.

The invention comprises a body unit or casing with a slot that extends across the width of the casing. The lace is drawn through the slot. One side of the slot is formed by a chamfered edge. Within the casing is a rotatable shaft which extends lengthwise across the length of the slot. The shaft is also provided with a set of chamfered ridges which extend the length of the shaft, across the length of the slot. The shaft, which has gear teeth on each end, rides on a pair of geared rails located within the casing adjacent each end of the slot. The shaft thus rolls laterally across the width of the slot toward and away from the chamfered side edge of the slot.

Spring biasing means urge the shaft toward the chamfered side edge of the slot. Therefore, when the shaft rolls toward the chamfered side edge of the slotted opening, the lace becomes pinched between the chamfered side edge of the slotted opening and the chamfered ridge on the shaft. The lace is released by rolling the shaft in the opposite direction. The rolling action of the shaft further permits the user to simply pull the lace through the device in one direction, and once the desired tension level is reached, the device automatically locks the lace in place. Further, the tension in the lace causes the shaft to roll even closer to the chamfered side edge of the slot such that the lace becomes further pinched, and thus held even tighter.

The device is further provided with a quick-release mechanism in order to roll the shaft away from the locking position and thereby release the lace.

The primary objects of the invention are therefore to provide a device for quickly and easily tightening and locking shoelaces on a shoe; to provide a device which allows the user to tighten his shoe by merely pulling upon the lace, and thereby automatically locking the lace in the desired tension; to provide a device which utilizes the tension in the tightened lace to enhance its grip on the lace; to provide a mechanism which will quickly release the shoelaces to allow the user to loosen and remove the shoe; and to provide a device which quickly allows the user to tighten his shoelaces, securely hold the laces in place, and to quickly release the laces when desired without the need of tying and untying or other types of knots.

Other objects and advantages of the invention will become apparent from the following description which sets forth, by way of illustration and example, certain preferred embodiments of the invention.

BRIEF DESCRIPTION OF THE DRAWINGS

The drawings, which constitute a part of the specification and include exemplary embodiments of the present invention, include the following.

DETAILED DESCRIPTION

Figure 1:
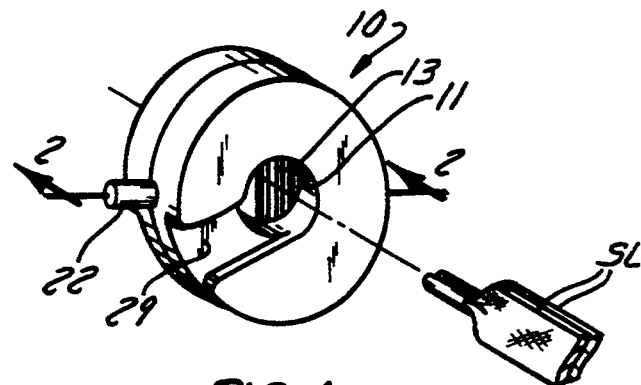
FIG. 1 is a perspective view of a shoelace tightening and king device constructed in accordance with the principles of the invention.
Figure 2:
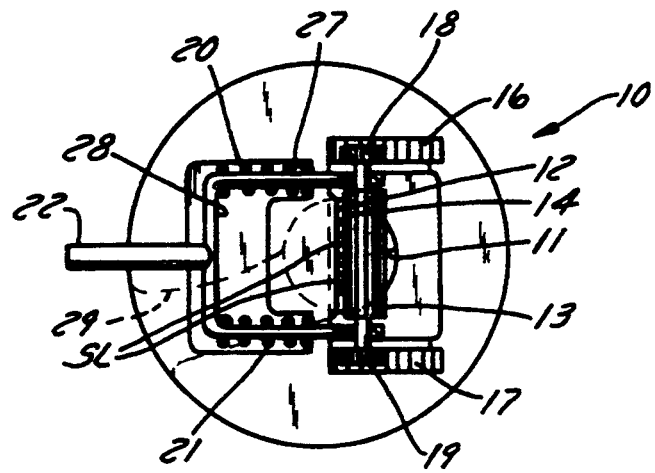
FIG. 2 is a cross-section view of the device showing the shaft pinching and locking a shoestring against the side edge of the slot.
Figure 3:
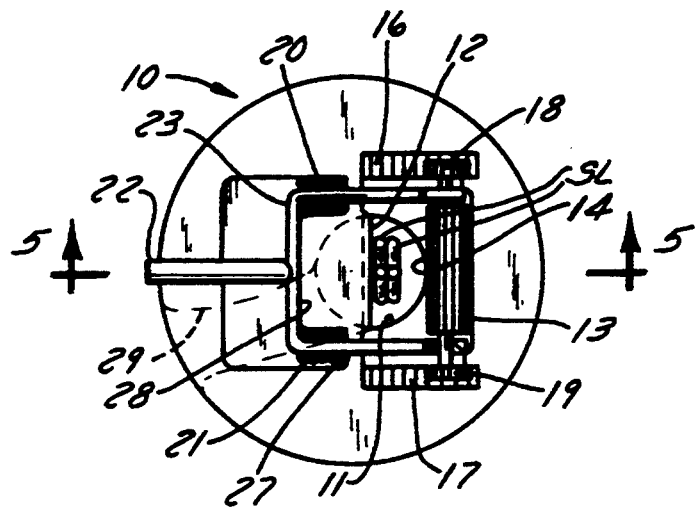
FIG. 3 is another cross-section view showing the position of the quick release mechanism to release the shoelace.
Figure 4:
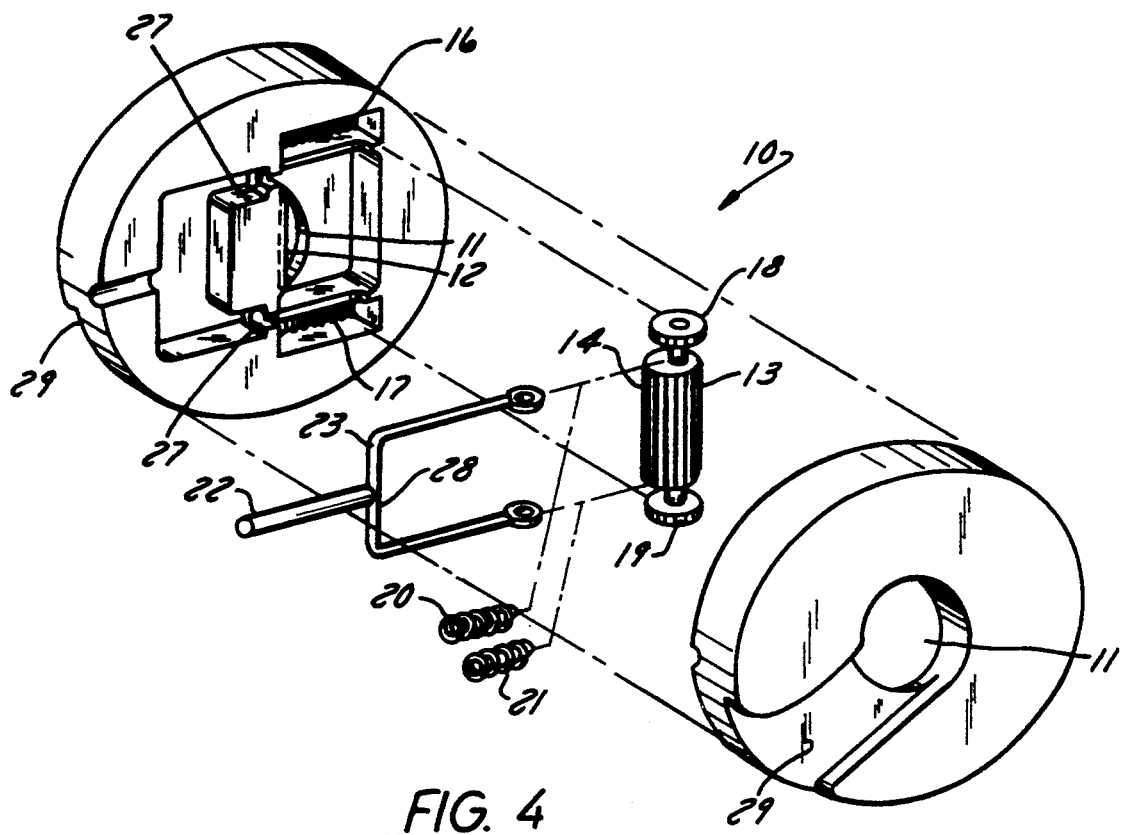
FIG. 4 is an exploded view of the device.
Figure 5:
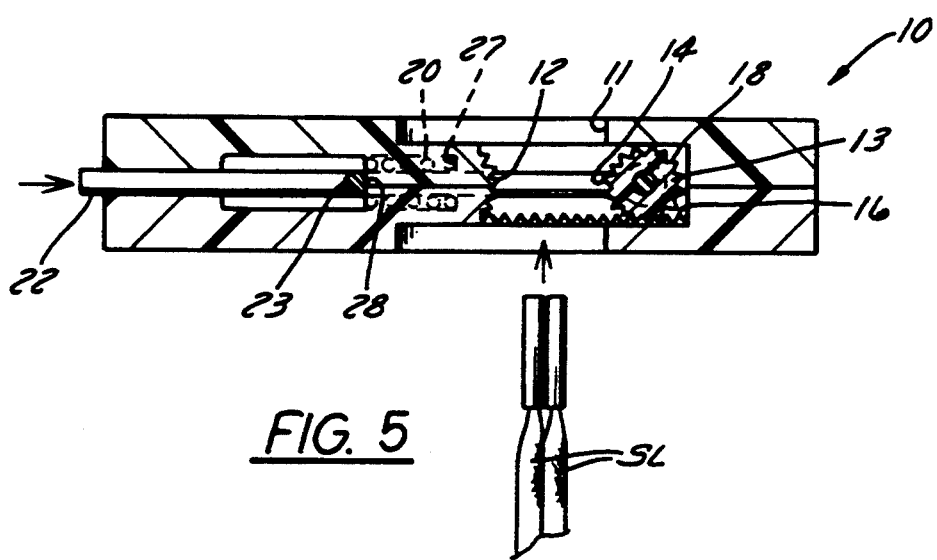
FIG. 5 is a cross-section side view showing the internal components of the device.

The following is a detailed description of my invention of a device for quickly tightening and locking shoelaces. Reference numerals following certain terms stated below correspond with the reference numerals in the drawings.

The invention comprises a device for tightening and locking shoelaces which includes a body unit or casing 10. The body unit 10 is preferably attached to the upper portion of a shoe, such as at the location where the uppermost hole for shoelaces would normally be positioned, although the device may also be configured in modular format to be sold as an accessory to shoes.

The body unit has a slotted opening 11 which extends across the width of the central portion of the body unit 10. The slotted opening 11 is formed on one side with a beveled or chamfered side edge 12 extending across the length of the slotted opening 11.

A shaft 13 within the body unit 10 also extends across the width of the slotted opening 11, and the shaft 13 is arranged so that it rolls laterally across the width of the opening 11. In other words, the axis of the shaft 13 extends lengthwise parallel to the length of the slot 11, and the shaft 13 is arranged to roll within the body unit 10 across the width of the slot 11 in a direction toward and away from the chamfered side edge 12 of the slotted opening 11.

The shaft 13 is also provided with a set of chamfered ridges 14 extending axially down the length of the shaft 13. In other words, the chamfered ridges 14 on the shaft 13 run parallel to the chamfered edges 12 along the side of the slotted opening 11. Furthermore, the side edge 12 of the slotted opening 11 is chamfered at an angle opposite the chamfered angle of the ridges 14 on the shaft 13. Consequently, when the shoelace SL is inserted through the slotted opening 11 and as the shaft 13 rolls toward the chamfered side edge 12 of the slotted opening 11, the shoelace SL becomes pinched between the chamfered ridges 14 of the shaft 13 and the chamfered side edge 12 of the slot 11. Furthermore, the tension of the tightened shoelace SL tends to rotate the shaft 13 in a direction toward the chamfered side edge 12 of the slotted opening 11, thereby pinching the lace SL even tighter.

Adjacent to each end of the slotted opening 11 are first and second gear rails 16 and 17. Also, first and second round gears 18 and 19 on the ends of the shaft 13 are rotatably engageable on the gear rails 16 and 17. Rotation of the shaft 13 thus causes it to roll laterally along the gear rails 16 and 17.

The device is further provided with a spring biasing means for urging the shaft 13 toward the chamfered side edge of the slotted opening 11. A quick-release mechanism is also provided for rolling the shaft 13 away from the chamfered side edge 12 of the slotted opening 11 to loosen the lace SL. The quick-release mechanism may be constructed in the form of a release lever arm 23 connected to each end of the shaft 13 and a tab 22 which projects outward from the body unit 10. In one embodiment, the release lever arm 23 extends from the ends of the shaft in a direction toward the chamfered side edge 12 of the slotted opening 11, and the tab 22 extends behind the slotted opening 11 and projects outward through the wall of the casing 10. In this arrangement, pushing the tab 22 causes the shaft 13 to roll away from the chamfered side edge 12 of the slotted opening 11 in order to release the shoelace SL.

In a second embodiment, a so-called pull tab quick-release mechanism, the release lever arm extends from the ends of the shaft in a direction away from the chamfered side edge of the slotted opening and a tab again projects outward from the wall of the casing. In this arrangement, pulling the tab causes the shaft to roll away from the chamfered side edge of the slotted opening in order to release the shoelace.

The spring biasing means may include a first spring 20 on a first arm of the release lever 23, which is connected to the first end of the shaft. A second spring 21 is placed on a second arm of the release lever 23, which is connected to a second end of the shaft 13. Each spring 20 and 21 is compressed between a first stop edge 27 on the body unit 10 and a second stop edge 28 on the release lever arm 23. The springs 20 and 21 are arranged so as to naturally force the shaft 13 toward the chamfered side edge 12 of the slotted opening 10, i.e., toward the locking position. By activating the quick-release mechanism, the shaft 13 is caused to roll away from the chamfered side edge 12 of the slotted opening 11.

When a shoelace SL introduced into the slotted opening 11, it is pinched between the chamfered side edge 12 of the slotted opening 11 and the chamfered ridges 14 of the shaft 13. The shoelace SL is released by activating the quick-release mechanism to roll the shaft 13 away from the chamfered side edge 12 of the slotted opening 11. Because the side edge 12 of the slotted opening 11 is chamfered at an angle opposite the chamfered angle of the ridges 14 on the shaft 13, pulling the shoelace SL in one direction caused the lace to effectively slip through the slotted opening 11 without interference. When the user has tightened the shoelaces to the proper tension, and he releases the lace, the cam action of the shaft 13 causes the chamfered ridges 14 on the shaft 13 to dig into the shoelace SL and pinch it against the chamfered side edge 12 of the slotted opening 11. Furthermore, the tension in the shoelace SL has the effect of further pulling on the chamfered ridges 14 on the shaft 13, thereby causing the shaft 13 to roll closer to the chamfered side edge 12 of the slotted opening 11, and thus further pinch the shoelace SL.

A channel 29 on the outer surface of the body unit 10 extending from the slotted opening 11 to the perimeter of the body unit helps guide the shoelace SL along the chamfered side edge 12 as the lace is being pulled by the user.

Finally, it is recognized that the present invention may be constructed in a number of configurations all of which satisfy the primary objects of providing a device for quickly tightening and locking a shoelace, and for quickly releasing the shoelace when desired by the user. Therefore, specific details of the invention disclosed above are not to be interpreted as limiting, but merely as a basis for the claims and for teaching one skilled in the art to variously practice and construct the present invention in any appropriately detailed manner. Changes may be made in details of construction of the invention without departing from the spirit of the invention, especially as defined in the following claims.

I therefore claim as my invention:

1. A device for tightening and locking shoelaces comprising:
   a body unit with a slotted opening therein;
   a chamfered side edge extending across one side of the slotted opening;
   a shaft rollable laterally across a width of the slotted opening toward and away from the chamfered side edge thereof;
   the shaft having a set of chamfered ridges extending axially down the length of the shaft;
   first and second geared rails adjacent to first and second ends of the slotted opening, respectively;
   first and second round gears on the first and second ends of the shaft rotatably engageable with the first and second geared rails, respectively;
   spring biasing means for urging the shaft toward the chamfered side edge of the slotted opening; and
   quick release means for rolling the shaft away from the chamfered side edge of the slotted opening;
   whereby a shoelace introduced into the slotted opening is pinchable between the chamfered side edge of the slotted opening and the chamfered ridges of the shaft and whereby the shoelace is releasable therefrom by activating the quick release means to roll the shaft away from the chamfered side edge of the slotted opening.

2. The device according to claim 1, wherein the quick release means comprises a release lever connected to each end of the shaft and the lever includes a tab projecting outward from the body unit.

3. The device according to claim 2, wherein the release lever extends from the ends of the shaft in a direction toward the chamfered side edge such that pushing the tab causes the shaft to roll away from the chamfered side edge of the slotted opening.

4. The device according to claim 2, wherein the release lever extends from the ends of the shaft in a direction away from the chamfered side edge such that pulling the tab causes the shaft to roll away from the chamfered side edge of the slotted opening.

5. The device according to claim 2, wherein the spring biasing means comprises a spring compressed between a first stop edge on the body unit and a second stop edge on the release lever.

6. The device according to claim 3, further comprising a first spring mounted on a first arm of the release lever which is connected to the first end of the shaft and a second spring mounted on a second arm of the release lever which is connected to the second end of the shaft.

7. The device according to claim 1, wherein the chamfered side edge of the slotted opening is chamfered at an angle opposite the chamfered angle of the chamfered ridge on the shaft such that pulling the shoelace in one direction has the effect of slipping the lace through the slotted opening, and pulling the shoelace in the opposite direction has the effect of rolling the shaft closer to the chamfered edge of the slotted opening and thereby further pinching the shoelace.

8. The device according to claim 1, wherein the body unit is fixed to an upper portion of a shoe.

* * * * *